US008129656B2

(12) United States Patent
Reichmann et al.

(10) Patent No.: US 8,129,656 B2
(45) Date of Patent: Mar. 6, 2012

(54) METHOD FOR PRODUCING THERMAL ENERGY

(75) Inventors: Richard Reichmann, Filderstadt (DE); Karl-Ludwig Barth, Fildestadt (DE)

(73) Assignee: Purratio AG, Neuhausen A.D.F. (DE)

( * ) Notice: Subject to any disclaimer, the term of this patent is extended or adjusted under 35 U.S.C. 154(b) by 670 days.

(21) Appl. No.: 12/065,748

(22) PCT Filed: Aug. 9, 2006

(86) PCT No.: PCT/EP2006/007882
§ 371 (c)(1),
(2), (4) Date: Mar. 6, 2009

(87) PCT Pub. No.: WO2007/028471
PCT Pub. Date: Mar. 15, 2007

(65) Prior Publication Data
US 2009/0206064 A1    Aug. 20, 2009

(30) Foreign Application Priority Data
Sep. 7, 2005   (EP) .................................... 05019473

(51) Int. Cl.
*B23K 9/00* (2006.01)
(52) U.S. Cl. ......... 219/121.59; 219/121.11; 219/121.36; 219/121.48
(58) Field of Classification Search ............. 219/121.59, 219/121.11, 121.36, 121.48, 121.56, 121.57
See application file for complete search history.

(56) References Cited

U.S. PATENT DOCUMENTS

| | | | |
|---|---|---|---|
| 3,906,398 A * | 9/1975 | Low et al. ................. | 372/87 |
| 3,946,381 A * | 3/1976 | Johnson et al. ............... | 365/116 |
| 4,201,931 A * | 5/1980 | Kurbitz et al. .................. | 315/10 |
| 4,916,273 A * | 4/1990 | Browning ............... | 219/121.47 |
| 5,562,841 A * | 10/1996 | Kulik et al. ............... | 219/121.59 |
| 5,729,580 A * | 3/1998 | Millspaugh .................. | 376/114 |
| 6,255,618 B1 * | 7/2001 | Shintani et al. .......... | 219/121.46 |
| 2006/0088138 A1 * | 4/2006 | Jouanneau .................... | 376/131 |
| 2006/0286492 A1 * | 12/2006 | Morrisroe ........................ | 431/2 |

FOREIGN PATENT DOCUMENTS

| EP | 0 393 465 | | 10/1990 |
|---|---|---|---|
| EP | 0 463 089 | B1 | 5/1996 |
| EP | 0 919 317 | | 6/1999 |

OTHER PUBLICATIONS

International Search Report for corresponding PCT Application No. PCT/EP2006/007882 mailed Apr. 20, 2007.

* cited by examiner

*Primary Examiner* — Huy Q Phan
*Assistant Examiner* — Kathryn Chang
(74) *Attorney, Agent, or Firm* — Renner, Otto, Boisselle & Sklar, LLP

(57) ABSTRACT

The invention relates to a method for producing thermal energy, wherein, by means of a plasma arc which is located between a cathode and an anode, light initial material that is suitable for fusion processes is put into the plasma state by supplying electric energy. Use is made of a cathode made of a metal that is suitable for allowing the particles which are produced in the plasma to be diffused and for allowing a fusion process to take place in the metal grid. The invention has a high degree of efficiency in corresponding systems such that said methods can be used anywhere where fossil and/or renewable and/or chemical fuels are used, in order to use the thermal energy directly or by conversion.

10 Claims, 1 Drawing Sheet

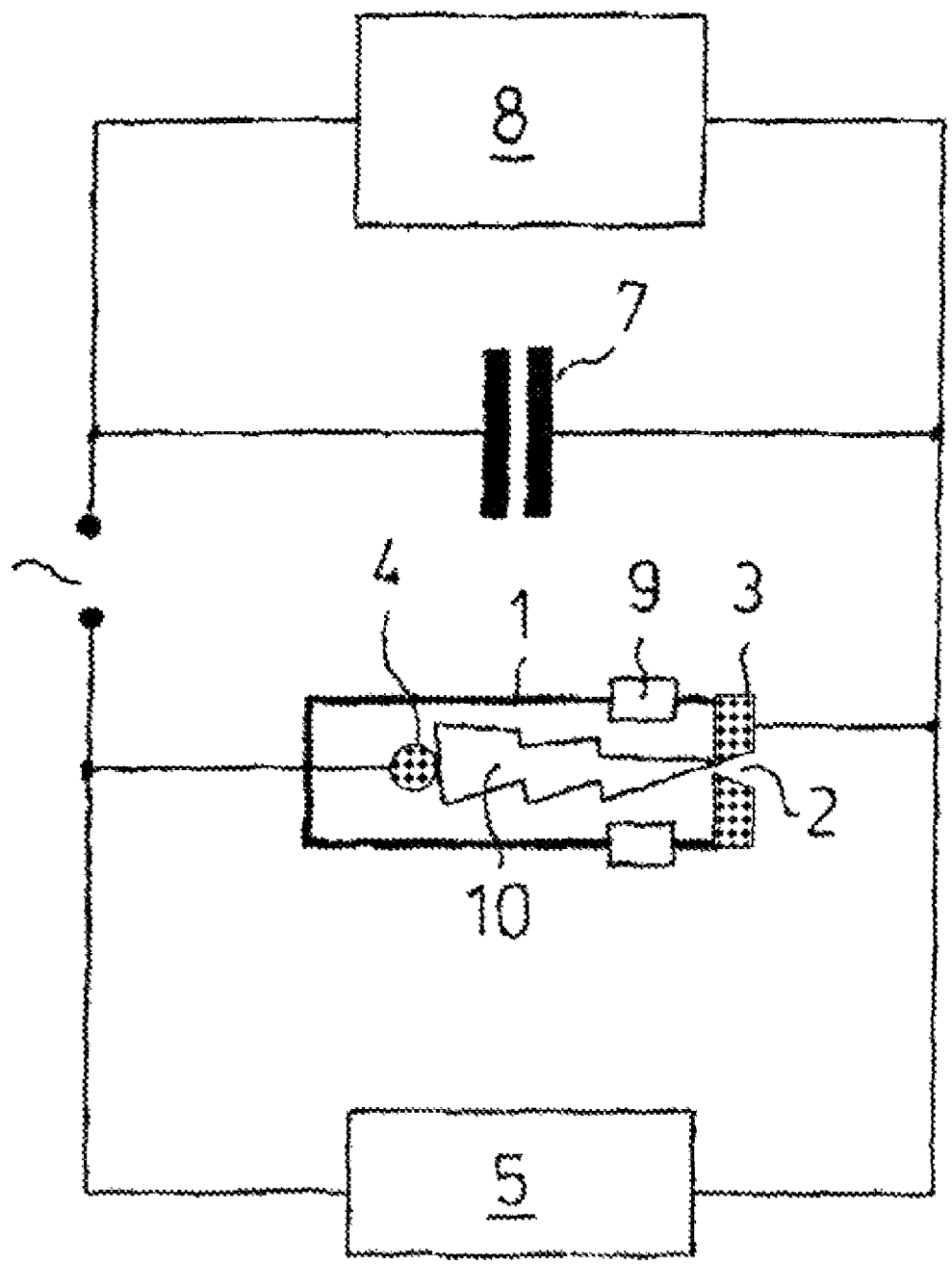

METHOD FOR PRODUCING THERMAL ENERGY

The invention relates to a process for producing thermal energy wherein, by supplying electric energy, light initial material that is suitable for fusion processes is dissociated, ionized, and then induced to fusion.

A method for generating a flame by means of a plasma arc wherein water vapor is dissociated into hydrogen and oxygen by supplying electric energy and the hydrogen is then ionized is known from EP 0 919 317 A1, and is used for the thermal processing of metals. With this method, water vapor is introduced via nozzles into an electrode chamber where a plasma arc is ignited by supplying electric energy. In a commercial device based on this method, a pistol-shaped plasma burner is supplied with electric energy by means of an electric supply device that can be operated with common line voltage. Inside the burner tube, an electric arc is ignited between the anode nozzle and the cathode that converts the water in that location first to a vapor state and then into a plasma state. In this process, the water molecules are dissociated and the components are ionized and exit as a plasma beam from the burner nozzle under the naturally generated pressure. By means of this plasma beam, metal can be cut, welded, soldered, and subjected to other kinds of thermal processing. In principle, this device is suitable for processing any non-combustible material, including non-rusting and high-alloyed steel, aluminum, titanium, brick, concrete, ceramic, with the quality of a laser beam.

In EP 463 089 B1, the so-called cold fusion is described wherein, by means of electrolysis, deuterium atoms are introduced into a lattice material that has a crystal structure, with the cold fusion being capable of generating surplus heat by means of nuclear fusion in the crystal structure without destroying the lattice material. There, but in connection with the electrolysis, the physical processes with various initial materials and reaction materials are described. In the past, the processes described there were also scientifically analyzed by others and are therefore part of the standard knowledge of a person skilled in the art.

In the meantime, based on this proposal, many experiments and proposals were made, but as far as can be determined, no proposal so far could be realized in a form that would be available to the general public as replacement for the essential common carriers of energy like gas, oil, coal, or uranium used for the manifold applications of energy production, be it for the direct generation of heat, of electric power, or mechanical power. This is true for industrial-scale systems as well as smaller systems for domestic use.

Therefore, this invention addresses the problem of proposing a method that makes it possible to generate surplus heat even in a small compact unit by using cold fusion.

According to the invention, this problem is solved by a method with the characteristics of the main claim. Additional advantageous implementations are described in the sub-claims.

According to the invention, in order to generate thermal energy, a plasma arc (with switchable polarity) located between a cathode and an anode is used in which suitable light initial materials that are capable of fusion processes are put in a plasma state by supplying electric energy. For this, a cathode made of a metal is used that is suitable for allowing the particles produced in the plasma to be diffused and for allowing a fusion process to take place in the metal grid.

The plasma arc located between the electrodes is commonly sustained by means of electric energy. The plasma arc is sustained in an atmosphere consisting of a material that contains the initial materials necessary for a nuclear fusion, e.g. hydrogen, deuterium, or tritium atoms or their ions, as well as lithium atoms and ions. As initial substance, simple water with its natural isotopes can be used or, to increase the efficiency, heavy water, deuterium-loaded water, tritium-substituted water and/or mixtures thereof with normal water. The necessary light initial material can be provided as such in solid, liquid, or gaseous form and then placed in the vicinity of the plasma arc. In gaseous form, it can be injected directly, in liquid form an intermediate evaporation step is necessary, for example directly by the heat of the plasma arc. In the plasma arc, these particles are put in the plasma state and, by operating with an appropriate amperage of above 3 A, are produced in a sufficient quantity to allow a suitable($H^+$, $D^+$, $T^+$, $Li^+$ ... and not $O^+$ or $N^+$) ion flow in the direction of the cathode. It can be expected that after passing through the cathode fall, the ions will impact on the cathode with a certain impact energy, and that the ion density on the cathode is very high.

In order to make surplus heat possible at all, the cathode is made of a material that has a metal grid (represented by the textured pattern of elements 3 and 4 of the figure) which makes a fusion process possible. The cathode may consist entirely of this material, or may merely be coated with it. Materials that are suitable for this, in principle, are metals from Group IIX and Group IV A of the periodic system and their alloys. Specifically, these are palladium, iron, cobalt, nickel, ruthenium, rhodium, osmium, iridium, titanium, zirconium, hafnium, and their alloys. The particles that are moved towards the cathode diffuse into the grid of the cathode material where they effect the nuclear fusion process described in the literature during which surplus heat is generated. This surplus heat can be removed in a wide variety of ways known to a person skilled in the art; in the simplest manner, for example, through removal of the heat by means of a liquid medium so that this heat can then be converted either directly or indirectly, in many different ways, to a different form of energy, like electric or mechanical energy, for example.

Palladium proved to be an especially preferred cathode material that is especially well suited due to its high work function of electrons of 5.6 eV when compared to the other materials listed above. With appropriate cooling of the cathode, it makes it much simpler to prevent an electron flow over the plasma arc generated by the heat that is generated at the cathode because this electron flow does not contribute anything to the heat generation process, or even hinders it because then the desirable particle flow in the direction of the cathode for triggering the nuclear fusion in the cathode does not form, or is impaired. In order to achieve a similar effect with other materials, due to the lower work function of electrons, a significantly higher cooling effort must be made in order to prevent or minimize the undesirable electron flow from the cathode.

The form and the volume of the cathode as well as the current density flowing through it determine the amount of heat that can be generated in the metal at a given electrical potential. The anode may also be coated with or made from one of the materials referred to above, but it appears sufficient to use any suitable conductor material for this, such as platinum, nickel, carbon, or copper, that itself does not react with components of the process in order to prevent the creation of undesirable reactions. An anode configuration favoring a large-area interaction of the plasma with the cathode is desirable.

According to another preferred implementation, the plasma is loaded with current pulses. These current pulses can be applied either instead of or in addition to a permanent current, and have the effect of a brief, strong increase of the current and therefore of the temperature in the plasma arc such that the desired particles are generated in a larger quantity, thereby effecting the particle flow in the direction of the cathode referred to above to an extent that will then effect a nuclear fusion with the cathode material that generates more thermal energy than needed for the operation of the plasma arc. Dependent on the amperages with which the plasma arc is operated, the length of the pulses may range from μsec to seconds. In the case of palladium, for example, the current pulses may have an amperage of 60 A for a short time, for example 1 μsec, in order to generate a required temperature. Depending on the amperage and the pulse length, many hydrogen ion isotopes ($H^+$, $D^+$, $T^+$ . . . ) or other suitable ions ($Li^+$) can be generated that are then available for the fusion process; of course, the amperage needs to be selected so that the cathode material is not destroyed. These current pulses have a triple effect: one, the brief heating referred to above for generating the particles $D^+$, $T^+$; two, prevention of excessive heating of the thermally slow-acting cathode material by the undesirable electron flow; and three, an increase of the fusion processes because these are especially effective in the palladium crystal at high currents, fast current change and, due to that, fast (μsec range) potential change in the solid body and in the plasma.

According to another implementation of the process, instead of a permanent current, the plasma arc can be operated at a sufficiently high number of current pulses per unit of time. To make this operation possible without a permanent operating voltage, the frequency should then be sufficiently high that the arc plasma receives the next pulse already in the afterglow of the preceding pulse.

According to a preferred implementation, the current pulses are generated via a high voltage supply that charges a capacitor, and a control spark gap; preferably, a capacitor with sufficient capacity for sustaining the necessary minimum amperages over the necessary minimum pulse lengths is used.

In addition, it is advantageous if additional energy in form of high frequency (HF) is superimposed on the plasma arc. If the HF is introduced at the ion plasma frequency $\omega_{pi}$ (i=$H^+$, $D^+$, $T^+$) of the hydrogen isotopes in question, or other isotopes suitable for fusion, it is possible to increase their energy in a controlled manner in order to influence the fusion process advantageously. If the frequency $\omega_{HF}$ of the applied HF field is selected to be below the ion plasma frequency $\omega_{pi}$ in question, it is possible to generate between the plasma and the cathode surface a HF boundary layer that makes an energetic ion bombardment of the cathode palladium surface with ion energies of several 100 eV to 1000 eV possible and intensifies the fusion process. Intrinsic change of potential processes like the intrinsic high-frequency sawtooth mode of a plasma torch are also suitable for creating the boundary layer.

The fusion processes become especially effective if the sequence of the impingement of the high-energy hydrogen isotope ions and the rapid change of the potential conditions (in the solid body as well as in the plasma) in the μsec range are in a certain temporal relationship to each other, especially if the events take place almost simultaneously.

In accordance with another implementation, the cathode— preferably made of palladium—can first be sequentially loaded with a certain hydrogen isotope and then be bombarded with another isotope that is suitable for fusion, in order to intentionally trigger special reactions like D-D or D-T, for example.

In its preferred embodiment, the cathode material is cooled. This can be done by appropriate cooling of the material if it is only located on the surface, or by cooling the cathode as a whole. For example, the cathode can be cooled by the initial material which will then evaporate and is turned into a plasma. Likewise, active cooling of the cathode and a different way of introducing the initial materials into the plasma are also possible. The fusion process becomes especially effective if the cathode is kept at low optimal temperatures. Preferably, the conditions for an electron flow from the cathode material are selected so that the electron flow becomes minimal. This can be achieved by the selection of appropriate materials, like preferably palladium or other materials suitable for fusion with a maximum work function of electrons, and with appropriate cooling.

As stated above, the removal of the surplus energy can be accomplished in many different ways that are familiar to a person skilled in the art. The sole FIGURE shows, in principle, the structure of a sample system for performing the process where the surplus energy is removed in the form of a flame. A suitable medium for this, for example water vapor, is located in a combustion chamber 1 with an anode 3 and cathode 4 that are insulated from each other by the insulation 9. It is commonly known from the literature that in order to stabilize the plasma arc the water vapor must be introduced into the combustion chamber 1 with a spin. The anode 3 has an outlet nozzle 2 for a flame generated by the plasma arc 10. The design of the outlet nozzle may be selected to match the application (e.g. Laval nozzle). The electrodes are connected with a control power supply 5 that supplies the necessary energy for the plasma arc in standard operating mode. Parallel to the control power supply 5, a capacitor or a capacitor battery 7 and a high voltage power supply 8 are connected via a spark gap 6.

The method according to the invention was performed experimentally with a commercial apparatus (Multiplaz 2500), by the Multiplaz AG company, that is offered as a device for thermal processing as described above. This apparatus uses water, and the plasma arc is sustained with a sawtooth voltage (sawtooth voltage with a DC portion of approximately 150 V with a maximum of 250 V, frequency approximately 25 kHz, output current with approximately 8-10 A maximum). Through the addition of a high voltage power supply 8 that charges a capacitor 7 of 1 μF with a voltage, current pulses are generated in addition to the operating voltage via a control spark gap 8 that result in a current pulse with a suitable amperage in the plasma, for example with 60 A in a cathode with palladium, with a duration of approximately 1-2 μsec. This made it possible to generate a significantly higher output power than was necessary for the generation.

By means of this method, it is possible to generate heat in a cost-efficient way and to use the method wherever fossil and/or renewable and/or chemical fuels are currently being used, in order to use the thermal energy either directly or through conversion to other usable forms of energy (mechanical energy, electric energy).

The invention claimed is:
1. A method for producing thermal energy, comprising:
   providing a combustion chamber with an anode and a cathode made from a material comprising a metal grid,
   using a metallic cathode material that is suitable for making a fusion process in the metal grid possible selected from the metals from Group IIX and Group IV A of the periodic system and their alloys, providing a gaseous atmosphere, in the combustion chamber, of a material that contains the light initial materials required for a nuclear fusion, generating a plasma arc by providing electrical energy between the electrodes initiating frequency change of the potential conditions, voltages, and currents existing in the plasma and in the cathode material, and providing an outlet nozzle at the anode as outlet of a flame generated by the plasma arc.

2. A method as claimed in claim 1, wherein an amperage of $\geqq 3$ A is used for producing the plasma state.

3. A method as claimed in claim 2, wherein pulses with an amperage and a pulse width are used that sustain temperature and density conditions for generating the particles in the plasma over a period of length.

4. A method as claimed in claim 1, wherein, instead of a permanent current, the plasma arc is operated at a frequent number of current pulses per unit of time so that the plasma arc receives the next current pulse within the preceding pulse.

5. A method as claimed in claim 1, wherein the current pulses are generated via a voltage power supply that charges a capacitor, and a control spark gap.

6. A method as claimed in claim 1, wherein additional energy in the form of high frequency at or below the ion plasma frequency in the individual case, is superimposed on the plasma arc.

7. A method as claimed in claim 6, wherein the cathode is sequentially loaded with a certain hydrogen isotope and is then bombarded with a different isotope that is suitable for fusion.

8. A method as claimed in claim 1, wherein the conditions for an electron flow from the cathode material are selected to minimize the electron flow.

9. A method as claimed in claim 3, wherein the pulses are in the μsec range.

10. A method as claimed in claims 7, wherein the cathode is a palladium cathode.

* * * * *